United States Patent
Izumi et al.

(10) Patent No.: US 8,930,983 B2
(45) Date of Patent: Jan. 6, 2015

(54) BROADCAST RECEIVING APPARATUS AND METHOD FOR CONTROLLING THE SAME

(75) Inventors: Michihiro Izumi, Kashiwa (JP); Yuichi Matsumoto, Fujisawa (JP); Nobuyuki Hanamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1015 days.

(21) Appl. No.: 12/555,466

(22) Filed: Sep. 8, 2009

(65) Prior Publication Data
US 2010/0064310 A1 Mar. 11, 2010

(30) Foreign Application Priority Data

Sep. 9, 2008 (JP) ................................. 2008-231192

(51) Int. Cl.
| | | |
|---|---|---|
| H04N 7/16 | (2011.01) |
| H04N 5/445 | (2011.01) |
| H04N 21/443 | (2011.01) |
| H04N 21/45 | (2011.01) |
| H04N 21/466 | (2011.01) |
| H04N 21/475 | (2011.01) |
| H04N 21/478 | (2011.01) |

(52) U.S. Cl.
CPC ......... *H04N 5/44513* (2013.01); *H04N 21/443* (2013.01); *H04N 21/4532* (2013.01); *H04N 21/4667* (2013.01); *H04N 21/4753* (2013.01); *H04N 21/4755* (2013.01); *H04N 21/478* (2013.01)
USPC .................... 725/25; 725/28; 725/29; 725/30

(58) Field of Classification Search
None
See application file for complete search history.

(56) References Cited

U.S. PATENT DOCUMENTS

| | | | |
|---|---|---|---|
| 7,921,440 B1* | 4/2011 | Kolde et al. ...................... 725/28 |
| 2005/0138179 A1* | 6/2005 | Encarnacion et al. ......... 709/227 |
| 2008/0163286 A1* | 7/2008 | Rudolph et al. ................ 725/28 |
| 2008/0189737 A1 | 8/2008 | Ellis | |
| 2011/0067048 A1* | 3/2011 | Barton et al. ................... 725/28 |
| 2011/0131607 A1* | 6/2011 | Thomas et al. ................. 725/40 |

FOREIGN PATENT DOCUMENTS

| | | |
|---|---|---|
| JP | 10-341425 A | 12/1998 |
| JP | 11-164220 A | 6/1999 |
| JP | 2006-262526 A | 9/2006 |

OTHER PUBLICATIONS

Machine Translation of Foreign Document JP 11-164220, Sanyo Electric Co, Jun. 18, 1999.*

* cited by examiner

*Primary Examiner* — Nathan Flynn
*Assistant Examiner* — Omar S Parra
(74) *Attorney, Agent, or Firm* — Canon USA, Inc. IP Division

(57) ABSTRACT

The present invention relates to an apparatus capable of transmitting video data to a display panel. The apparatus includes a managing unit configured to manage history information on a program transmitted to individual display panels in association with display panel information, a first determination unit configured to determine whether the program transmitted to the display panels is a restricted program that requires authentication information, a second determination unit configured, if the program is determined to be the restricted program, to determine, using the history information, whether the display panel is a display panel that displayed the restricted program in the past, and a control unit configured to transmit video data of the restricted program to the display panel if the display panel displayed the restricted program in the past.

20 Claims, 4 Drawing Sheets

| VIEWING ORDER | DISPLAY PANEL NAME | PROGRAM NAME | CHANNEL | VIEWING RESTRICTION |
|---|---|---|---|---|
| 1 | PANEL 1 | PROGRAM A | CH. 1 | RESTRICTED |
| 2 | PANEL 2 | PROGRAM Y | CH. 4 | RESTRICTED |
| 3 | PANEL 2 | PROGRAM B | CH. 2 | NOT RESTRICTED |
| 4 | PANEL 1 | PROGRAM D | CH. 1 | NOT RESTRICTED |
| 5 | PANEL 1 | PROGRAM B | CH. 2 | NOT RESTRICTED |

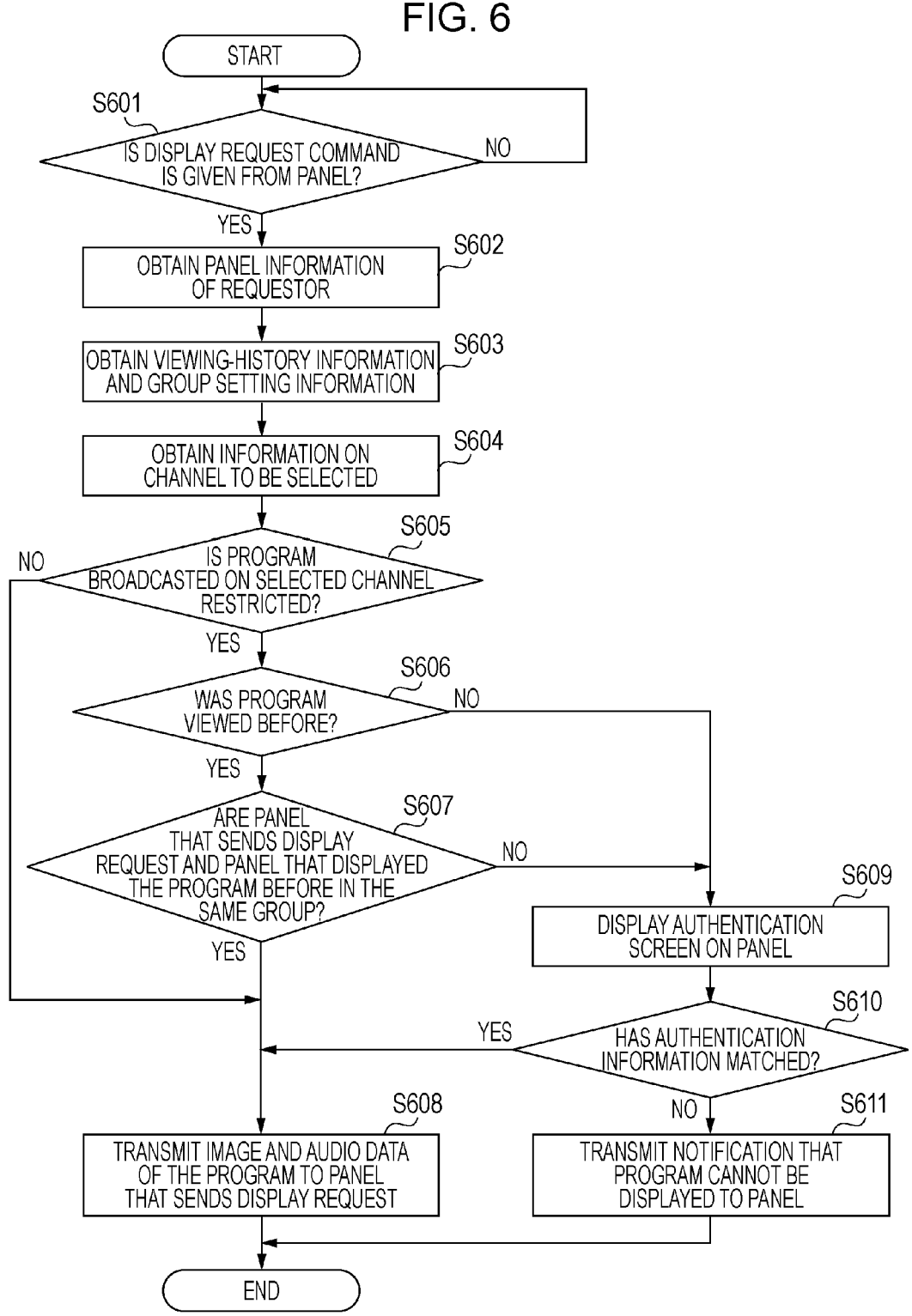

BROADCAST RECEIVING APPARATUS AND METHOD FOR CONTROLLING THE SAME

BACKGROUND OF THE INVENTION

1. Field of the Invention

The present invention relates to an apparatus capable of displaying an image of a broadcast program on a plurality of display panels and a method for controlling the same.

2. Description of the Related Art

Some of TV broadcast programs are available only to particular persons; for example, pay broadcast programs that require special contract and restricted programs that are available only to persons older than a predetermined age. To view such programs, viewers are sometimes requested to input authentication information, such as a password, on television.

Inputting authentication information is a troublesome process; however, once the power is turned off, inputting the authentication information again arises to view the same program again, which may be is a troublesome operation for the viewer. Thus, Japanese Patent Laid-Open No. 11-164220 discloses a technology for the viewer to continue viewing a program, if it has become available by inputting a password, without inputting the password when the power is turned on again.

The number of display panels displayed on the wall increases as they are recently becoming thin. For such usage, television sets in which a tuner (broadcast transmitter receiver) and a display panel are separated begin to be used. Furthermore, a configuration in which one tuner is shared among a plurality of display panels begins to be achieved. Such a configuration is disclosed in Japanese Patent Laid-Open No. 2006-262526.

As is disclosed in Japanese Patent Laid-Open No. 2006-262526, it is expected that display panels having no broadcast receiving function, that is, no tuner, will become common. In this case, a program image that a broadcast receiving apparatus provided separately from the display panel has received is transmitted to the display panel wirelessly or by wire. The transmitted program image is thus displayed on the display panel. Such an independent structure of the display panel and the broadcast receiving apparatus allows a plurality of display panels to share one broadcast receiving apparatus. This configuration may be selected over the installing a plurality of broadcast receiving apparatuses in terms of convenience and cost. For example, at home, a broadcast receiving apparatus is installed in a living room, and display panels are installed in the living room, a bedroom, and a child's room. A program image to be displayed on the individual display panels is transmitted from the broadcast receiving apparatus. By giving an operation instruction to the broadcast receiving apparatus through the individual display panels, viewers can enjoy the same ease of use as with conventional television receiving apparatuses in which a broadcast transmitter receiver and a display are integrated to one.

However, the common use of a broadcast receiving apparatus by a plurality of display panels may pose situations in which viewing programs may require an authentication process, such as inputting a password, described above. For example, in a case where a viewer uses authentication to view a program on a display panel disposed, for example, in a living room, the broadcast receiving apparatus determines whether the program viewing request is given from a viewer who is permitted to view the program using an authentication process. As a result of the authentication, if the program viewing request is given from an authenticated viewer, the program image is transmitted to the display panel in the living room, and the display panel displays the image.

If the technology disclosed in Japanese Patent Laid-Open No. 11-164220 is applied to the thus-configured broadcast receiving system, a situation occurs in which a viewer who is not permitted to view the program can sometimes view the program. That is, if another viewer in a child's room selects the same program in a state in which the power of the display panel in the living room is turned off, the program image is displayed on the display panel in the child's room without the viewer in the child's room being requested for an authentication process.

This is because the television broadcast receiving apparatus disclosed in Japanese Patent Laid-Open No. 11-164220 assumes only a broadcast receiving apparatus (television set) in which a tuner and a display panel are integrated to one. In other words, the technology disclosed in Japanese Patent Laid-Open No. 11-164220 excludes the operating environment in which one tuner is shared among a plurality of displays, disclosed in Japanese Patent Laid-Open No. 2006-262526.

If such a conventional simple authentication process is applied to the broadcast receiving system which is expected to become widespread, a situation in that an unauthenticated person can view a viewing-restricted program occurs. However, requesting authentication every time the power is turned on, as described above, may required a time consuming operation from the viewer.

SUMMARY OF THE INVENTION

According to an aspect of the present invention, there is provided an apparatus includes a managing unit configured to manage history information on a program transmitted to individual display panels in association with display panel information; a first determination unit configured to determine whether the program transmitted to the display panels is the restricted program that requires authentication information; a second determination unit configured, if the program is determined to be the restricted program, to determine, using the history information, whether the display panel is a display panel that displayed the restricted program in the past; and a control unit configured to transmit video data of the restricted program to the display panel if the display panel displayed the restricted program in the past, and if the display panel did not display the restricted program in the past, to request the authentication information.

Other features of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a flowchart for program viewing control according to a second embodiment of the present invention.

DESCRIPTION OF THE EMBODIMENTS

Exemplary embodiments of the present invention will now be described in detail in accordance with the accompanying drawings.

Figure 1:
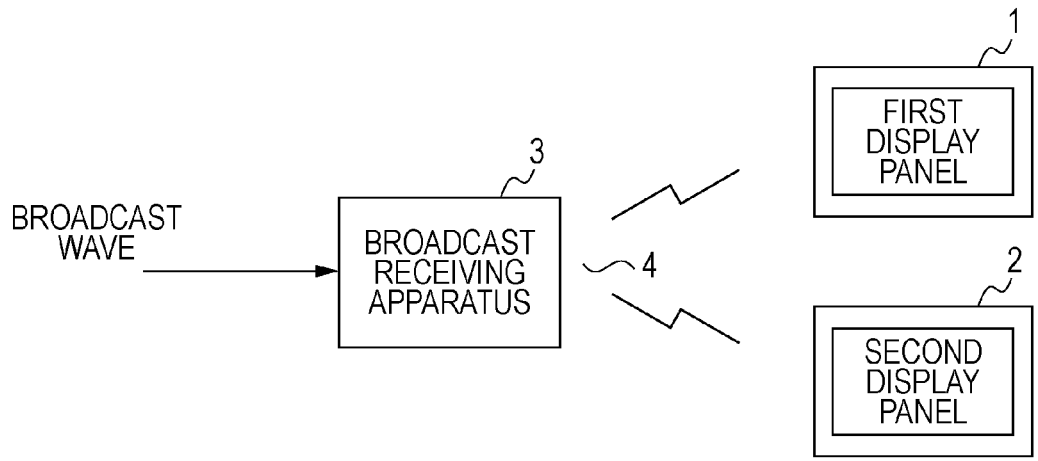
FIG. 1 is a configuration diagram of a broadcast receiving system according to a first embodiment of the present invention.

FIG. 1 is a configuration diagram of a broadcast receiving apparatus and a broadcast receiving system according to a first embodiment of the present invention.

In this diagram, a first display panel 1 and a second display panel 2 receive and display an image output from a broadcast receiving apparatus 3.

The broadcast receiving apparatus 3 serves as a broadcast receiving function of the broadcast receiving apparatus and the broadcast receiving system that embody the present invention. The display panels 1 and 2, and the broadcast receiving apparatus 3 are connected by wireless transmission 4. That is, the broadcast receiving apparatus 3 is provided as a casing independent from the display panels 2 and 3. Video data constituted of a 1,920×1,080 image transmitted from the broadcast receiving apparatus 3 and a command used between the broadcast receiving apparatus 3 and the display panels 1 and 2 are sent to the display panels 1 and 2 by radio. In this embodiment, the broadcast receiving apparatus 3 and the display panels 1 and 2 are connected by wireless transmission 4, for example, a wireless HDMI (high-definition multimedia interface), but another wireless transmission may be used. Not only the wireless transmission but also cable transmission using a local area network (LAN) or HDMI cable may be used.

Figure 2:
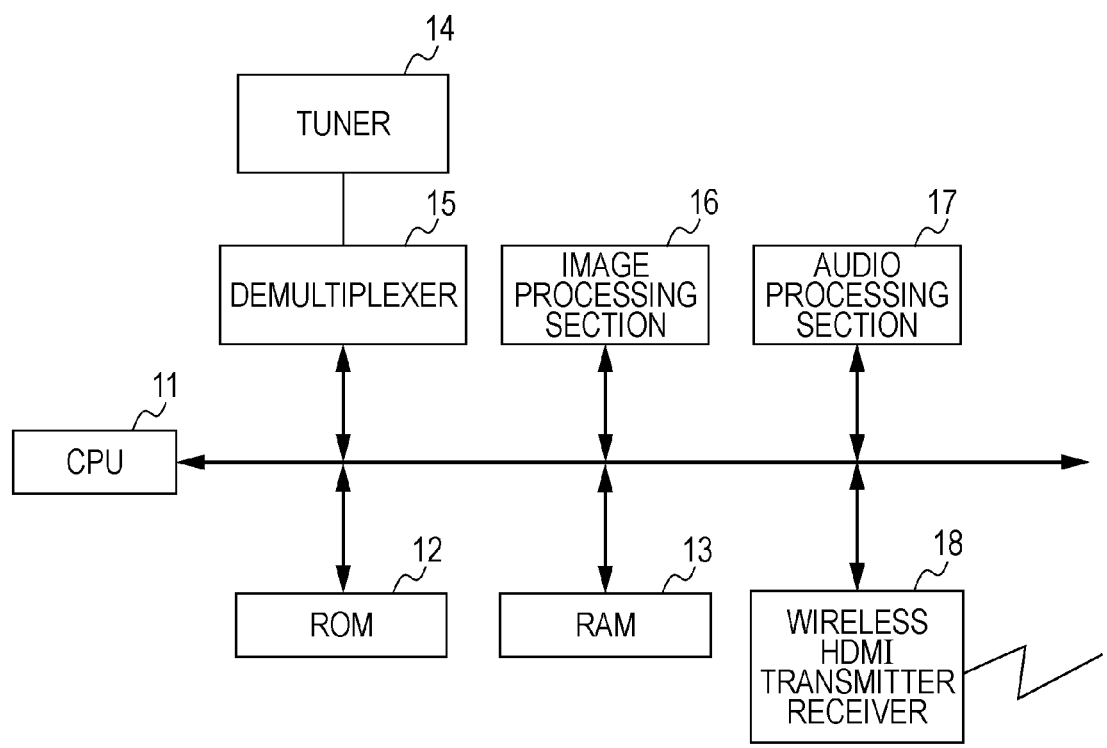
FIG. 2 is a diagram showing an internal configuration of a broadcast receiving apparatus according to the embodiment of the present invention.

FIG. 2 is a diagram showing an internal configuration of the broadcast receiving apparatus 3. In this diagram, a CPU 11 controls the broadcast receiving apparatus 3 in accordance with a program stored in a ROM 12.

A RAM 13 is a volatile memory, which is used as a work memory of the operation of the CPU 11 and also as a temporary storage area of various data. In particular, the RAM 13 is used as an area for storing viewing-history information described later.

A tuner 14 decodes a broadcast signal received through an antenna to output stream data in which an image and sound are multiplexed. In this embodiment, the broadcast receiving apparatus 3 is equipped with tuners more than the number of the display panels. That is, this embodiment has a configuration in which programs of different channels may be viewed using a plurality of display panels at the same time. A demultiplexer 15 separates the stream data received from the tuner 14 into video stream data and audio stream data.

The video stream data separated by the demultiplexer 15 is input to an image processing section 16. The image processing section 16 decodes the video stream data subjected to MPEG-2 coding and then converts it to video data corresponding to the panel by I/P conversion, γ-processing, scaling, etc.

The audio stream data separated by the demultiplexer 15 is input to an audio processing section 17. The audio processing section 17 decodes the audio stream data subjected to AAC coding into a linear PCM format.

The video data and the audio data generated by the above-described processes are combined into a predetermined HDMI frame format and are transmitted by radio by a wireless HDMI transmitter receiver 18. The wireless HDMI transmitter receiver 18 not only can transmit video data and audio data but also can receive authentication information, such as a password, transmitted from the display panel 1 or 2.

Figures 3, 4:
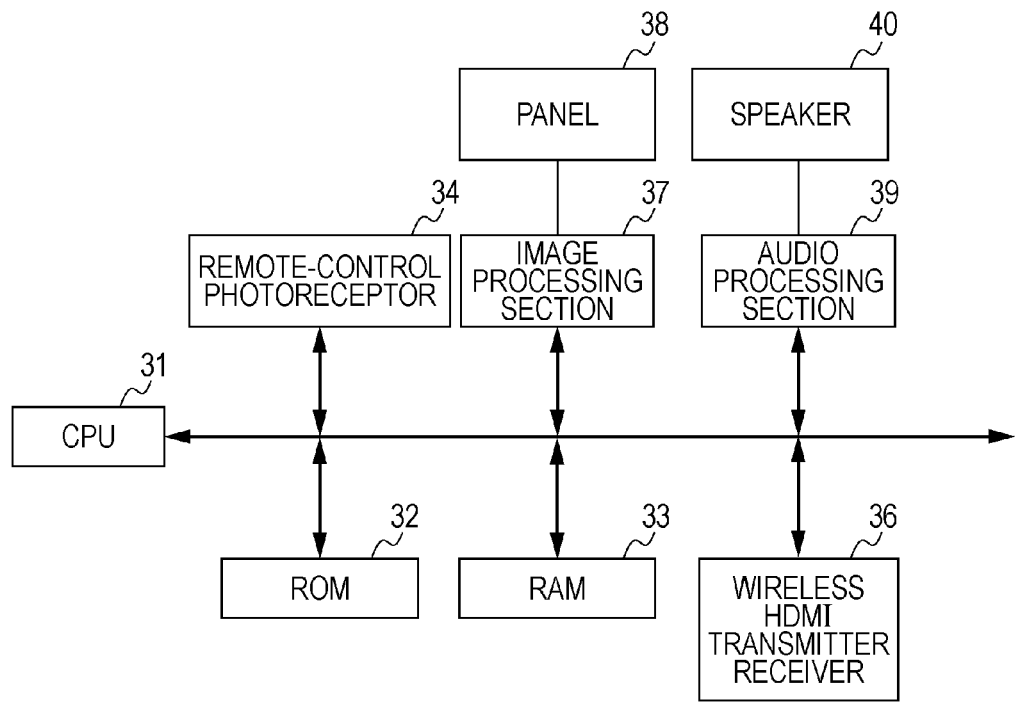
FIG. 3 is a diagram showing the internal configuration of display panels according to the embodiment of the present invention.
FIG. 4 is an image diagram showing viewing-history information according to the embodiment of the present invention.

FIG. 3 is a diagram showing the internal configuration of the display panel 1 or 2 according to the present invention. In the diagram, a CPU 31 controls the display panel 1 or 2 in accordance with a program stored in a ROM 32. A RAM 33 is a volatile memory, which is used as a work memory of the operation of the CPU 31 and also as a buffer of various data.

A remote-control photoreceptor 34 receives a command transmitted using infrared rays from an operating remote control.

A wireless HDMI transmitter receiver 36 receives video data and audio data transmitted from the broadcast receiving apparatus 3 and stores them separately in the RAM 33. The wireless HDMI transmitter receiver 36 not only can receive video data and audio data but also can transmit authentication control information, such as a password, to the broadcast receiving apparatus 3.

The video data stored in the RAM 33 is subjected to a timing conversion process corresponding to the display panel 1 or 2 in an image processing section 37 and is displayed on a panel 38.

The audio data stored in the RAM 33 is subjected a digital-to-analog conversion process in an audio processing section 39 and is output to a speaker 40.

FIG. 4 is an image diagram showing viewing-history information which is the histories of programs that the individual display panels 1 and 2 displayed using the tuners 14 in the broadcast receiving apparatus 3. The smallest number in the viewing order indicates a program viewed at the last time. The display panel name presents panel name information on display panels to which video data, etc., can be transmitted from the broadcast receiving apparatus 3. Program name information and channel information associated with the panel name information are information for identifying the names and the channels of programs that viewers viewed using the display panels. Viewing-restriction information that indicates whether the programs are restricted programs is managed in association with the program name information and the channel information.

These information are updated when a program-image display request is generated from a display panel, and video data and audio data of the program are transmitted to the display panel that has issued the request. Accordingly, even if a display request is generated, but the requested program is a restricted program, and the viewer could not remove the restriction, the viewing-history information is not updated.

While FIG. 4 shows the program name and the channel as program names and channel names themselves, IDs assigned to programs and channels may be recorded instead of them.

Figure 5:
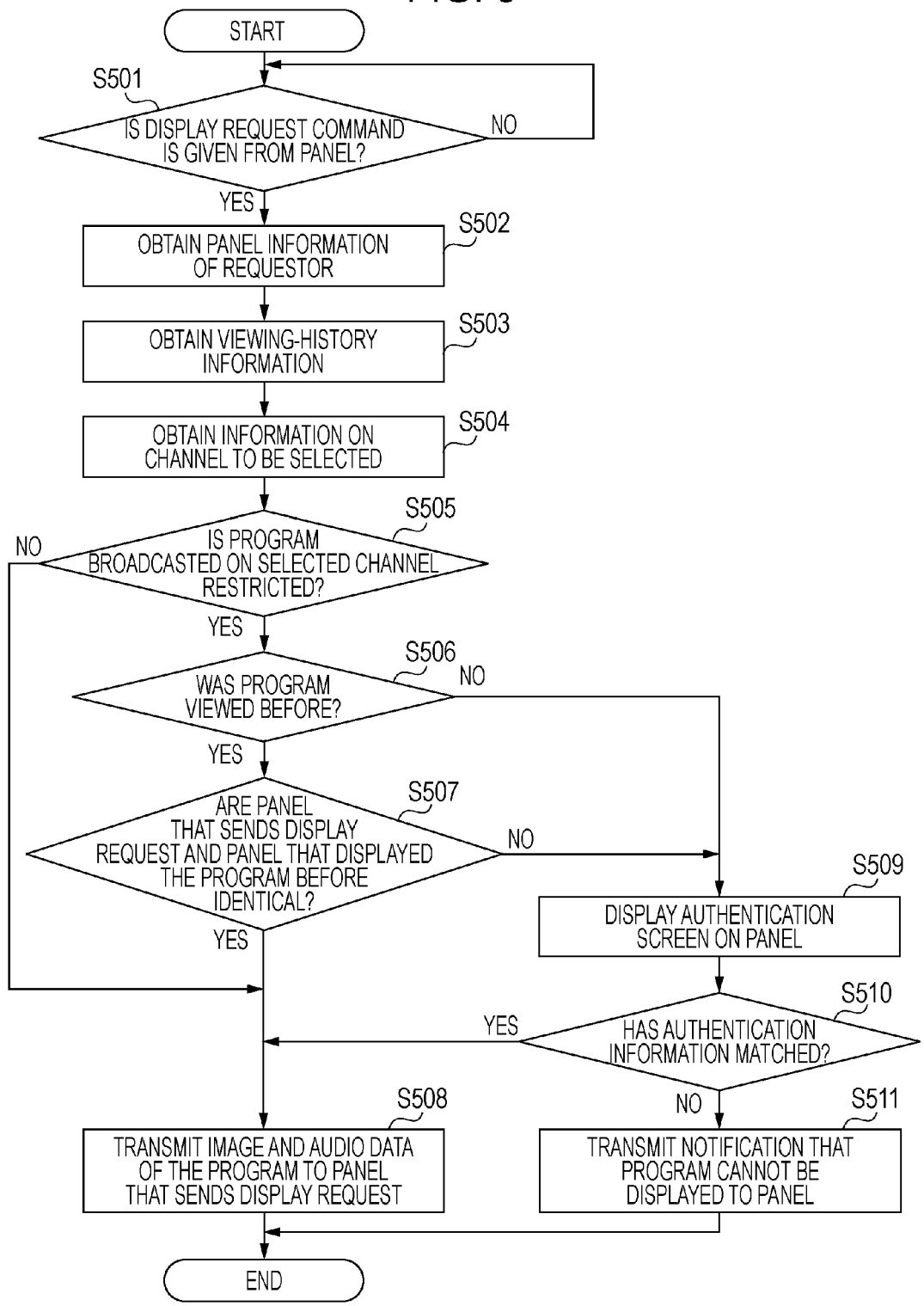
FIG. 5 is a flowchart for program viewing control according to the first embodiment of the present invention.

Next, program viewing control of the broadcast receiving apparatus 3 of this embodiment will be described using a flowchart shown in FIG. 5. The process steps of this flowchart are mainly controlled by the CPU 11 of the broadcast receiving apparatus 3.

First, a viewer operates a remote control (not shown) corresponding to a display panel that the viewer wants to view a program to turn on the power of the display panel. As the power of the display panel is turned on, the display panel transmits a display request command to the broadcast receiving apparatus 3. This is a command to instruct the broadcast receiving apparatus 3 to transmit an image on a predetermined channel to the display panel. In step S501, the process determines whether the broadcast receiving apparatus 3 receives the display request command from the display panel through the wireless HDMI transmitter receiver 18. Assume that the broadcast receiving apparatus 3 is left turned on;

however, it can be turned on or off in cooperation with the on/off of the display panel. If the process determines that a display request command is give for the panel, the process proceeds to step S502. Otherwise, the process goes back to START.

Subsequently, in step S502, the CPU 11 issues a command for obtaining panel information to be used for identifying the display panel to identify the display panel that has transmitted the display request command. The CPU 11 obtains the panel information as a response from the display panel. If the display request command that is received from the display panel in step S501 contains the panel information, the process in step S502 can be omitted.

Subsequently, in step S503, the CPU 11 refers to viewing-history information stored in the RAM 13 and obtains it. Thereafter, in step S504, the CPU 11 obtains channel information on a channel from the display panel that has issued the display request. In general, a channel that was viewed at the last power-off is automatically selected when the display panel is turned on. To perform such control, the CPU 11 obtains information on the channel that the display panel displayed at the last time using the viewing-history information that was referred to in step S503. The CPU 11 controls the tuner 14 to select the channel.

Next, in step S505, the CPU 11 determines whether a program that is broadcasted on the selected channel at present is a viewing-restricted program. This determination can be made from the description of service information which can be obtained over a broadcast wave. If this is not a viewing-restricted program, then the CPU 11 advances the process to step S508.

In step S505, if the program that is broadcasted on the selected channel at present is a viewing-restricted program, then the CPU 11 advances the process to step S506. In step S506, the CPU 11 determines whether the restricted program was viewed in the past using the viewing-history information referred to in step S503. If it was not viewed in the past, then the process moves to step S509. In contrast, if it is found from the viewing-history information that the restricted program was viewed in the past, the process moves to step S507. The determination on whether it was viewed in the past is made under the condition that it is completely the identical program. For example, even if a series program, that is broadcasted once a week, is a restricted program and was viewed last week, it does not show that the program was viewed in the past. That is, in step S506, the CPU 11 determines whether the currently broadcasted program itself was viewed during the broadcasting time in the past.

In step S507, the CPU 11 determines whether the display panel that has transmitted the display request and the display panel that displayed the restricted program in the past are identical using the panel information obtained in step S502 and the viewing-history information obtained in step S503. If it is determined that they are identical, then the process moves to step S508. In contrast, if it is determined that they are not identical, the process moves to step S509.

In step S508, the CPU 11 transmits the video data and the audio data of the program to the display panel that has requested display. The case in which the process moves from step S507 directly to step S508 means that the identical restricted program was viewed using the display panel that has requested display, that is, the restriction was removed. In other words, this is a case in which the user performs an authentication process from removing the viewing restriction at the previous viewing, and thereafter, the power of the display panel was temporarily turned off and was again turned on. In this case, the CPU 11 transmits the video data etc. of the program to the display panel without requesting an authentication process again for removing the viewing restriction.

On the other hand, if the process moves from step S506 and step S507 to step S509, the CPU 11 executes control to make the display panel that has transmitted the display request command display a screen for requesting an authentication process to view the restricted program. To execute the control, for example, the CPU 11 should transmit a command to call a screen for requesting an authentication process, which is stored in the display panel in advance, from the broadcast receiving apparatus 3. Alternatively, the broadcast receiving apparatus 3 may transmit screen data for requesting an authentication process. In any case, in step S509, the broadcast receiving apparatus 3 executes control to make the display panel that has transmitted the display request command display a screen for requesting an authentication process.

The viewer executes an authentication process on the displayed authentication processing screen. If the authentication process requests a password, the viewer inputs a password using a remote control (not shown) etc. Of course, another configuration for executing the authentication process without using a password may be employed. In step S510, input authentication information is transmitted from the display panel to the broadcast receiving apparatus 3, and the CPU 11 determines whether the transmitted authentication information matches authentication information for viewing the restricted program. If the authentication information match, then the viewing restriction can be removed, and therefore, the process moves to step S508. The process in step S508 is as described above. If the authentication information do not match, the restricted program cannot be viewed, and therefore, in step S511, the CPU 11 transmits information indicating that the program image cannot be displayed to the display panel.

This is the program viewing control of the broadcast receiving apparatus 3 in this embodiment.

The above-described program viewing control will be described using a concrete example in which the viewing-history information shown in FIG. 4 is used.

The control will be described from a state in which the broadcast receiving apparatus 3 has the viewing history shown in FIG. 4 and both the first display panel 1 and the second display panel 2 are at power-off. From this state, the first display panel 1 is turned on and issues a display request to the broadcast receiving apparatus 3.

The broadcast receiving apparatus 3 receives the display request and panel information from the first display panel 1 and obtains viewing-history information from the RAM 13. Since a channel that the first display panel 1 displayed the last time is Ch. 1, which is managed as viewing order 1, the CPU 11 performs control to receive Ch. 1 using the tuner 14.

Subsequently, the CPU 11 determines whether the currently broadcasted program on the selected Ch. 1 is a viewing-restricted program from the description of service information that can be obtained over the broadcast wave. Here, suppose that a program A is the currently broadcasted program. The program A is a restricted program. Subsequently, the CPU 11 determines whether the currently broadcasted program A was viewed in the past from the viewing-history information. The viewing-history information shows that the program A has a history that it was viewed on the first display panel 1. This shows that the program A that is broadcasted on the selected channel when the power is turned on was viewed before the power was turned off the last time. If it is determined that the program A was viewed in the past, then the CPU 11 determines whether the display panel with which the program A was viewed in the past is the same as the first display panel 1 with reference to the viewing-history information. The viewing-history information shown in FIG. 4 indicates that the program A was viewed on the first display panel 1. It has also been determined that the display panel that has transmitted the display request is the first display panel. Accordingly, the CPU 11 can determine that the program A was viewed on the first display panel 1 by removing the restriction and that this display request is also issued from the same first display panel 1.

Thus, the CPU 11 transmits the video data and the audio data of the program A to the first display panel 1 without executing the process of displaying an authentication processing screen on the first display panel 1.

On the other hand, if the display panel that has transmitted the display request is the second display panel 2, authentication for removing the restriction is performed to view the program A on the second display panel because the program A was viewed on the first display panel 1.

The above is the description of the program viewing control of this embodiment using a concrete example. By the above-described processes, with a display panel for which a viewing restriction on a restricted program is removed, even if viewing is stopped when the power is temporarily turned off, when the power is turned on again while the restricted program is broadcasted and the viewing of the program is restarted, the program can be viewed without an authentication process. On the other hand, even if an authentication process for removing the viewing restriction on the restricted program has been completed, another authentication process is performed for a display request from another display panel. This can eliminate the complexity of user's operation due to repeated authentication processes and can prevent a viewer who should not view a restricted program from viewing the restricted program without a request for authentication as much as possible.

In this embodiment, the number of the display panels assumes two; however, this embodiment can be offered even with more than two display panels.

Next, a second embodiment of the present invention will be described. The first embodiment described above executes the control in which, to view a program that was viewed in the past by removing a viewing restriction, the program was displayed without requesting an authentication process if the display panel was used to view the program in the past. On the other hand, this embodiment executes control, in a system including three or more display panels, to group the display panels, so that, for a display panel set in the same group as a display panel that was used to view the program in the past, to display the program without requesting an authentication process.

The system configuration of this embodiment is a system in which one or more display panel is added to the system configuration in FIG. 1. This embodiment will be described assuming that there are three display panels. Since the configurations of the broadcast receiving apparatus 3 and the display panels are the same as those shown in FIG. 2 and FIG. 3, descriptions thereof will be omitted.

In this embodiment, two display panels are set as a group A, and the remaining one display panel is set as a group B. The group setting is completed by displaying a group setting screen on a panel and storing grouping information input on the setting screen in the RAM 13 of the broadcast receiving apparatus 3 as group setting information. The setting information, for example, the first display panel 1 and the second display panel belong to the group A, and the remaining display panel belongs to the group B, is managed in the RAM 13 in correspondence with the panel information for identifying the display panels.

Subsequently, program viewing control of this embodiment will be described using a flowchart shown in FIG. 6.

The process steps of this flowchart are mainly controlled by the CPU 11 of the broadcast receiving apparatus 3.

First, a viewer operates a remote control (not shown) corresponding to a display panel that the viewer wants to view a program to turn on the power of the display panel. As the power of the display panel is turned on, the display panel transmits a display request command to the broadcast receiving apparatus 3. Since steps S601 and S602 are the same as steps S501 and S502 of the first embodiment, descriptions thereof will be omitted.

In step S603, the CPU 11 obtains predetermined group-setting information in addition to the viewing-history information.

Since steps S604, S605, and S606 are the same as steps S504, S505, and S506 in the first embodiment, descriptions thereof will be omitted.

In step S607, the CPU 11 determines whether the display panel that has transmitted the display request and a display panel on which the restricted program was displayed in the past belong to the same group. If it is determined that they belong to the same group, then the process proceeds to step S608. In contrast, if it is determined that they do not belong to the same group, the process proceeds to step S609.

Since steps S608 to S611 are the same as steps S508 to S511 in the first embodiment, descriptions thereof will be omitted.

The program viewing control described above can eliminate an authentication process when a restricted program is viewed using a display panel that belongs to the same group as a display panel on which the restricted program was displayed in the past.

The program viewing control in the second embodiment is shown in the following cases. For example, display panels in a living room and a parent's bedroom are set in the same group, and a display panel in a child's room is set as another group. Suppose parents view an adult program in the living room. If they move from the living room to the bedroom while the program is broadcasted and continue to view the program, the program was viewed by removing the restriction in the living room and is restarted on a display panel in the same group while the restricted program is broadcasted. Therefore, there is no need for the parents to execute an authentication process on the restricted program in the bedroom, allowing continuing the viewing easily. On the other hand, even if a child operates the display panel in the child's room, to select a channel on which the restricted program is broadcasted while the restricted program is broadcasted, the restricted program cannot be viewed unless the restriction is removed by an authentication process because this display panel is set as the other group different from the display panels in the living room and the bedroom. That is, it is substantially impossible to view the restricted program in the child's room.

In this way, in a broadcast receiving system having three or more display panels, grouping display panels allows control on whether to perform an authentication process during viewing a program according to the need of the viewer.

In the second embodiment, in the case where a viewer views a restricted program again, which is the same as that viewed in the past, with a display panel set as the same group as that used in the past, while the restricted program is broadcasted, there is no need for an authentication process. However, in a state in which the two display panels in the same group are displaying a program, the following situation may arise.

In the state in which both of the two display panels in the same group are displaying a program, different viewers may be using the individual display panels. Accordingly, in the case where after one display panel that displays a restricted program is turned off, the channel that is broadcasting the restricted program is selected on the other display panel, there is a high possibility that the viewer who was viewing the restricted program and the viewer who selected the channel on the other display panel are different. In this case, if the viewer who is using the other display panel can view the restricted program without being requested to perform an authentication process, a situation may occur in that a program whose restriction can be removed only by a particular viewer can be freely viewed.

Thus, in the case where, when viewing of a restricted program is stopped (power is turned off) on a display panel, the other display panel in the same group as the display panel on which the restricted program was displayed is displaying a program on a certain channel, an authentication process is requested even if the other display panel in the same group selects the restricted program. Specifically, the CPU 11 determines whether the other display panel in the same group is displaying a program image when the viewing of the restricted program is stopped. Since the broadcast receiving apparatus 3 performs control to transmit video data etc. to a display panel that is displaying an image, it should be determined whether transmission is made to determine whether the display panel is displaying an image.

If the other display panel in the same group is not displaying an image, the control shown in FIG. 6 should be executed. In contrast, if one of the other display panels in the same group is displaying a program image, an authentication process for removing the restriction should be requested depending on whether a request to display the restricted program that was viewed was received from the display panel in the past.

Such control can prevent a viewer who should not view a restricted program from viewing it by mistake as much as possible.

If the broadcast receiving apparatus 3 has a clocking function, control to turn off the function of the second embodiment during a period of time set by the viewer can also be added. For example, it is possible to perform control to execute an authentication process even for a display panel in the same group, for example, from 23 o'clock to 6 o'clock in the next morning.

Subsequently, a third embodiment of the present invention will be described. In the first and the second embodiments described above, an authentication process is not required in the case where, after the power of a display panel that was displaying a program by removing a viewing restriction was turned off, the viewer tries to view the same restricted program on the same display panel or a display panel in the same group. However, if a long time has passed from the power-off, the viewer who turned on the power may not be the viewer who viewed the program by removing the viewing restriction.

Thus, the broadcast receiving apparatus 3 is provided with a timer. The CPU 11 measures the time, using the timer, elapsed from the power-off of a display panel that was displaying a restricted program by removing a viewing restriction. The CPU 11 performs control to request an authentication process if a viewer tries to view the same restricted program again on the same display panel or a display panel in the same group after the measured time from the power-off exceeds a predetermine time, for example, three minutes.

Thus, if the viewer who removed the viewing restriction temporarily interrupts the display and then continues the viewing again, the viewer is allowed to view it without repeating the authentication process. Furthermore, this can eliminate the possibility that a viewer other than the viewer who removed the viewing restriction views the restricted program on the same display panel or a display panel in the same group without executing an authentication process as much as possible.

As has been described above, according to the embodiments of the present invention, in the case where a broadcast receiving apparatus is shared among a plurality of display panels, a viewer, who is permitted to view a restricted program, is permitted to view the restricted program without being requested to perform repeated authentication processes, and a viewer who is not permitted to view a restricted program is prevented from viewing the restricted program by executing an appropriate authentication process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-231192 filed Sep. 9, 2008, which is hereby incorporated by reference herein in its entirety.

What is claimed is:

1. An apparatus for transmitting video data of a restricted program to a plurality of display panels comprising:
    a managing unit configured to manage display panel information for identifying each display panel and history information related to a program displayed on each displayed panel;
    a first determination unit configured to determine whether a program to be displayed on a display panel is a restricted program that requires authentication information;
    a second determination unit configured, in a case where the program to be displayed on the display panel is the restricted program, to determine, by using the display panel information and the history information, whether the display panel which displays the restricted program is a same display panel that has displayed the restricted program in the past; and
    a control unit configured to transmit video data of the restricted program to the display panel without requesting for the authentication information in a case where the display panel which displays the restricted program is the same display panel that has displayed the restricted program in the past, and to request for the authentication information in a case where the display panel which displays the restricted program is not the same display panel that has displayed the restricted program in the past,
    wherein the restrict program requires authentication information only the first time it is displayed on the display panel, and does not require authentication information from the second time it is displayed on the display panel.

2. The apparatus according to claim 1, further comprising a setting unit configured to perform setting of grouping at least two display panels into a same group,
    wherein in a case where it is determined by the second determination unit that another display panel that is set in the same group as a specified display panel that has displayed the restricted program in the past, the control unit executes control to transmit the video data of the restricted program to the display panel without requesting for the authentication information.

3. The apparatus according to claim 2, further comprising: a timer configured to measure a time elapsed after power of a specified display panel that has displayed the restricted program is turned off.

4. The apparatus according to claim 3, wherein when a viewer tries to display the restricted program again on another display panel set in the same group as the specified display panel after the measured time exceeds a predetermined time, the control unit executes control to request for the authentication information.

5. The apparatus according to claim 1 further comprising a setting unit configured to perform setting of grouping at least two display panels into a same group,
wherein when the specified display panel stopped displaying of the restricted program, the control unit determines whether an arbitrary video data is being transmitted to another display panel in the same group as the specified display panel, and
wherein in a case where the control unit determined that an arbitrary video data is being transmitted to the other display panel in the same group as the specified display panel when the specified display panel stopped displaying of the restricted program, the control unit executes control to request for the authentication information in response to the other display panel requests to display the restricted program.

6. The apparatus according to claim 1, further comprising: a timer configured to measure a time elapsed after power of the display panel that has displayed the restricted program is turned off.

7. The apparatus according to claim 6, wherein when a viewer tries to display the same restricted program again on the display panel that has displayed the restricted program after the measured time exceeds a predetermined time, the control unit executes control to request for the authentication information.

8. The apparatus according to claim 1, wherein the apparatus is a broadcast receiving apparatus capable of transmitting the video data generated from a received broadcast signal to the display panel.

9. A method for controlling an apparatus for transmitting video data of a restricted program to a plurality of display panels comprising:
managing display panel information for identifying each display panel and history information related to a program displayed on each display panel;
determining whether a program to be displayed on the display panel is a restricted program that requires authentication information;
in a case where the program to be displayed on the display panel is determined to be the restricted program, determining, by using the display panel information and the history information, whether the display panel which displays the restricted program is a same display panel that has displayed the restricted program in the past; and
in a case where the display panel which displays the restricted program is the same display panel that has displayed the restricted program in the past, performing control to transmit video data of the restricted program to the display panel without requesting for the authentication information, and in a case where the display panel which displays the restricted program is not the same display panel that has displayed the restricted program in the past, performing control to request for the authentication information,
wherein the restrict program requires authentication information only the first time it is displayed on the display panel, and does not require authentication information from the second time it is displayed on the display panel.

10. The method according to claim 9, further comprising: grouping at least two display panels into a same group, wherein:
in a case whether it is determined in the determining using the history information that another display panel that is set in the same group as a specified display panel that has displayed the restricted program in the past, executing control to transmit the video data of the restricted program to the display panel without requesting for the authentication information.

11. The method according to claim 10, further comprising: measuring a time elapsed after power of a specified display panel that has displayed the restricted program is turned off using a timer,
wherein the requesting for the authentication information includes executing control to request for the authentication information when a viewer tries to display the restricted program again on another display panel set in the same group as the specified display panel after the measured time exceeds a predetermined time.

12. The method according to claim 9, further comprising setting of grouping at least two display panels into a same group,
wherein the requesting for the authentication information, when the specified display panel stopped displaying the restricted program includes determining whether an arbitrary video data is being transmitted to another display panel in the same group as the specified display panel, and
wherein in case where the control unit determined that an arbitrary video data is being transmitted to the other display panel in the same group as the specified display panel, executing control to request for the authentication information in response to the other display panel requests to display the restricted program.

13. The method according to claim 9, further comprising: measuring a time elapsed after power of a display panel that has displayed the restricted program is turned off using a timer,
wherein the requesting for the authentication information includes executing control to request for the authentication information when a viewer tries to display the same restricted program on the display panel that has displayed the restricted program after the measured time exceeds a predetermined time.

14. The method according to claim 9, wherein the method is a method for controlling a broadcast receiving apparatus capable of transmitting the video data generated from a received broadcast signal to the display panel.

15. A non-transitory computer readable medium storing a computer-executable program of instructions for causing a computer to perform a method for controlling an apparatus for transmitting video data of a restricted program to a plurality of display panels comprising:
managing display panel information for identifying each display panel and history information related to a program displayed on each display panel;
determining whether a program to be displayed on the display panel is a restricted program that requires authentication information;
in a case where the program to be displayed on the display panel is determined to be the restricted program, determining, by using the display panel information and the history information, whether the display panel which displays the restricted program is a same display panel that has displayed the restricted program in the past; and in a case where the display panel which displays the restricted program is the same display panel that has displayed the restricted program in the past, performing control to transmit video data of the restricted program to the display panel without requesting for the authentication information, and in a case where the display panel which displays the restricted program is not the same display panel that has displayed the restricted program in the past, performing control to request for the authentication information, wherein the restrict program requires authentication information only the first time it is displayed on the display panel, and does not require authentication information from the second time it is displayed on the display panel.

16. The non-transitory computer readable medium according to claim 15, further comprising:

grouping at least two display panels into a same group, wherein in a case whether it is determined in the determining using the history information that another display panel that is set in the same group as a specified display panel that has displayed the restricted program in the past, executing control to transmit the video data of the restricted program to the display panel without requesting for the authentication information.

17. The non-transitory computer readable medium according to claim 16, further comprising:

measuring a time elapsed after power of a specified display panel that has displayed the restricted program is turned off using a timer, wherein the requesting for the authentication information includes executing control to request for the authentication information when a viewer tries to display the restricted program again on another display panel set in the same group as the specified display panel after the measured time exceeds a predetermined time.

18. The non-transitory computer readable medium according to claim 15 further comprising setting of grouping at least two display panels into a same group, wherein the requesting for the authentication information, when the specified display panel stopped displaying the restricted program includes determining whether an arbitrary video data is being transmitted to another display panel in the same group as the specified display panel, and wherein in case where the control unit determined that an arbitrary video data is being transmitted to the other display panel in the same group as the specified display panel, executing control to request for the authentication information in response to the other display panel requests to display the restricted program.

19. The non-transitory computer readable medium according to claim 15, further comprising:

measuring a time elapsed after power of a display panel that has displayed the restricted program is turned off using a timer, wherein the requesting for the authentication information includes executing control to request for the authentication information when a viewer tries to display the same restricted program on the display panel that has displayed the restricted program after the measured time exceeds a predetermined time.

20. The non-transitory computer readable medium according to claim 15, wherein the method is a method for controlling a broadcast receiving apparatus capable of transmitting the video data generated from a received broadcast signal to the display panel.

\* \* \* \* \*